United States Patent [19]
Jenni

[11] 3,863,315
[45] Feb. 4, 1975

[54] PROCESS FOR THE MANUFACTURE OF A PIEZOELECTRIC SUSPENSION DEVICE

[75] Inventor: Gerald Jenni, Peseux, Switzerland

[73] Assignee: Oscilloquartz S.A., Neuchatel, Switzerland

[22] Filed: June 25, 1973

[21] Appl. No.: 373,265

[30] Foreign Application Priority Data
July 7, 1972 Switzerland.................... 10179/72

[52] U.S. Cl................. 29/25.35, 29/418, 29/471.1, 29/628, 310/9.4
[51] Int. Cl............................................. B01j 17/00
[58] Field of Search ....... 29/25.35, 628, 471.1, 418; 310/8.2, 9.4

[56] References Cited
UNITED STATES PATENTS

| | | | |
|---|---|---|---|
| 3,080,640 | 3/1963 | Jochems........................ | 29/628 UX |
| 3,500,013 | 3/1970 | Snel et al........................ | 29/628 X |
| 3,692,225 | 9/1972 | Lincoln........................... | 29/628 X |

*Primary Examiner*—Carl E. Hall
*Attorney, Agent, or Firm*—Robert E. Burns; Emmanuel J. Lobato; Bruce L. Adams

[57] ABSTRACT

Process for the manufacture of a piezoelectric resonator suspension device, this device comprising at least two flexible connections welded on the one hand to two electrodes of the resonator and on the other to at least two supports, the connections serving as connections for the resonator electrodes, and further comprises a comb-piece is cut out from a thin metal plate, having on the one hand positioning devices and on the other at least one flexible connection having a first part forming a stub for welding to one of the electrodes of the said resonator, and a second part forming a spring and whose end is for welding to one of the said supports, there being on the said stub a welding plate for welding the said stub to the said electrode, at least one of these comb-pieces being taken and located, by the said positioning devices, in a jig in which the said resonator is held so that the said stub equipped with its welding plate comes to bear against a predetermined point on the said electrode, the welding plate being fused so as to weld stub and electrode together, the said suspension device being parted from the said comb-piece and the end of the second part of the said device being welded to one of the said supports.

5 Claims, 5 Drawing Figures

PROCESS FOR THE MANUFACTURE OF A PIEZOELECTRIC SUSPENSION DEVICE

The primary object of this invention is a manufacturing process for a piezoelectric resonator suspension device, this device comprising at least two flexible connections welded on the one hand to the two electrodes of the said resonator, and on the other to at least two supports, these supports acting as connections for the resonator electrodes.

Such devices comprising rectangular section strips, with one end attached direct to the resonator electrode and the other to the support, are already known. These strips are bent once parallel to the resonator at the end, so as to form a welding stub, a second time to form a lug, and a third time for providing connection to the support.

The difficulty in manufacturing these supports is great, their total length being approximately 2.6 mm, the first bend having a radius of 0.1 mm, the lug a curvature of 0.4 mm and the last connection a curvature of 0.25 mm. Positioning and welding these connections at exact locations on the electrodes also present serious problems, and the time for completing these operations is considerable, apart from which the absolute precision necessary for proper operation of the resonator and reproducibility is only achieved with difficulty.

The object of the invention is a particularly simple and economical manufacturing process for a piezoelectric resonator suspension device, giving complete accuracy in positioning the suspension components and an appreciable saving in the time needed for manufacture, and for positioning and welding the components. In addition, perfect reproducibility can be achieved thanks to this process.

According to the present invention a process for the manufacture of a piezoelectric resonator suspension device comprises the steps of:

a. forming a comb-piece from a thin metal plate,
b. forming means in the thin metal plate for positioning same in a jig,
c. forming at least one connection in the comb-piece, said connection having an end part forming a stub provided with a welding plate for welding to one of the electrodes of the resonator and a flexible spring-like portion connecting said connection to the comb-piece and a bulge being provided in said flexible spring-like portion in proximity to where said portion joins the comb-piece,
d. positioning said comb-piece by means of said devices in said jig and positioning a said resonator in said jig so that said stub equipped with said welding plate comes to bear againsst a predetermined point on said one electrode,
e. welding said welding plate to said predetermined point on said one electrode,
f. parting said flexible spring-like portion from said comb-piece between the comb-piece and said bulge, and
g. welding said bulge to a support of the suspension device.

The second object of this invention is a piezoelectric resonator equipped with a suspension device obtained by this process.

The attached drawing illustrates, as an example, different stages in the manufacturing process in accordance with the invention.

Figure 1:
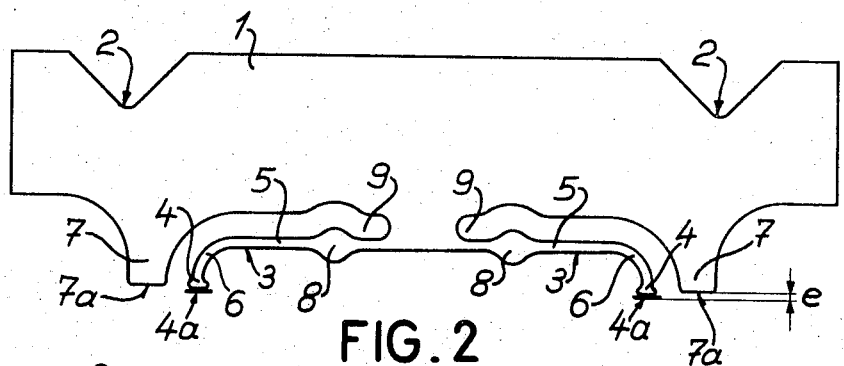
FIG. 1 represents a comb-piece cut out in accordance with the process and having two connection members.

According to the process, a comb-piece 1 is cut out from a thin metal rectangular plate, for example of beryllium bronze. This comb-piece 1 has on the one hand positioning devices 2, which can be, as shown, notches cut in one side of the rectangle.

The comb-piece 1 has on the other hand two connection members 3. These connection members 3 each have a first part 4 forming a stub, and a second long elastic part 5, forming a spring leaf. The two parts are joined by a thin bent portion 6.

Welding plates 4a are placed on the faces of the stubs 4.

This comb-piece further has two abutments 7, of which the active faces 7a are on a plane distant by an amount e from a plane passing through the plates 4a. The purpose of this distance e will be explained later.

Figure 2:
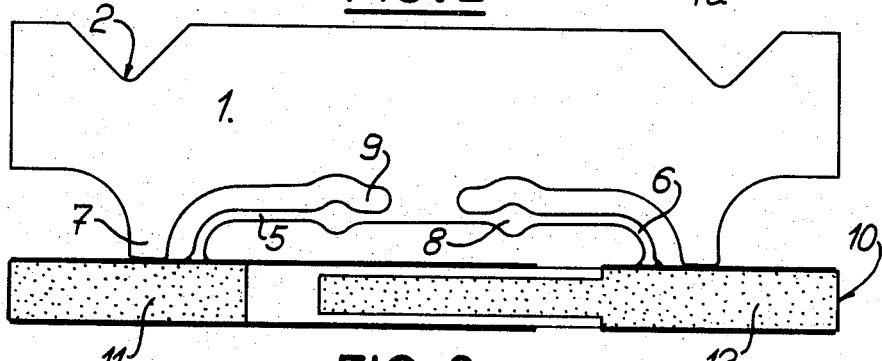
FIG. 2 shows the positioning of a cut out comb-piece in accordance with the invention.

In accordance with the process, a comb-piece 1 is placed, as shown in FIG. 2, in a position which, in view of its simplicity, will not be described. The piezoelectric resonator 10 is held against the comb-piece shown in FIG. 2 in the position, the resonator being, for example, a quartz bar operating under flexure in the X-Y mode.

The resonator 10 has for its excitation two metallised electrodes 11 and 12. Positioning of the comb-piece 1 is achieved by means of the positioning devices 2, which work in conjunction with similar devices, not shown, on the jig. When the bar 10 and the comb-piece 1 are placed in the jig, the faces 7a of the abutments 7 come to bear against the bar 10. Due to the distance a between the plane of the welding plates faces 4a on the stubs of the connections 3, these connections are lightly loaded, and exert a pressure on these plates 4a. It will be seen that this process allows easy positioning of the stubs at the desired points on the electrode, using the positioning devices and abutments.

To weld the stubs 4, it is sufficient to bring the welding plate 4a to its fusion temperature, which can be done by an external heat source such as hot gas concentrated on the plate, infrared ray, laser beam or other well-known means. The pressure exerted by the loading of the connection gives a perfect weld. Preferably the comb-piece is gilded and a eutectic low-melting-point welding plate is used, for example of gold tin. After these two welds have been made, the two connections are separated from the comb-piece by cutting at a predetermined point after the bulge 8 at 9. This bulge 8 serves to effect the weld on the support as will be described below.

Figure 3:
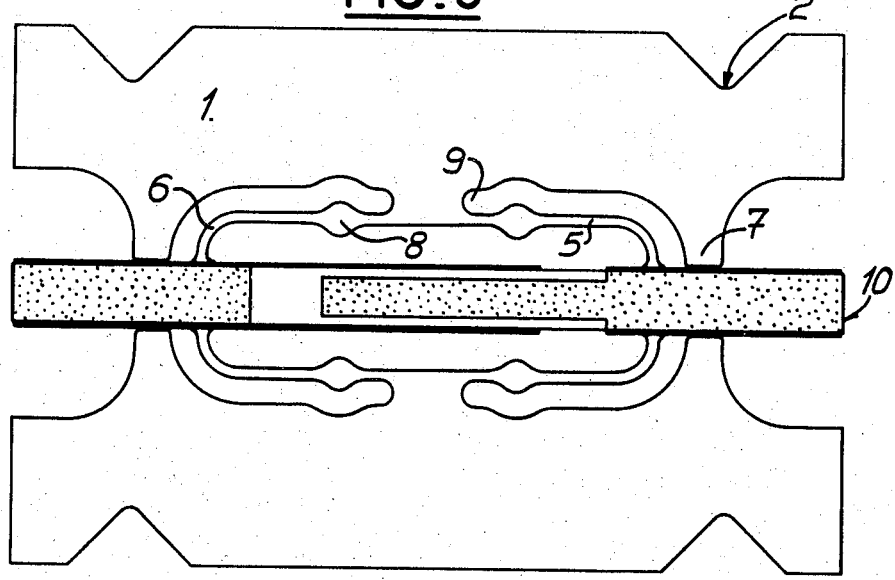
FIG. 3 shows the positioning of two cut out comb-pieces in accordance with the invention.

In accordance with the process described above it will be seen that the two connections 3 are easily welded to the resonator electrodes 10. It is however preferable, to give a better suspension, to use two pairs of connections 3 as shown in FIG. 3. The process is the same as previously described, but two comb-pieces are placed in the jig instead of one so as to make the four welds of the stubs 4. These stubs 4, once the comb-piece is in position, come to bear against the desired points on the electrodes 10 and 11, due to the loading of the connections 3.

After the welds are made, the four connections are cut after the bulges 8 at 9, as previously described.

Figure 4:
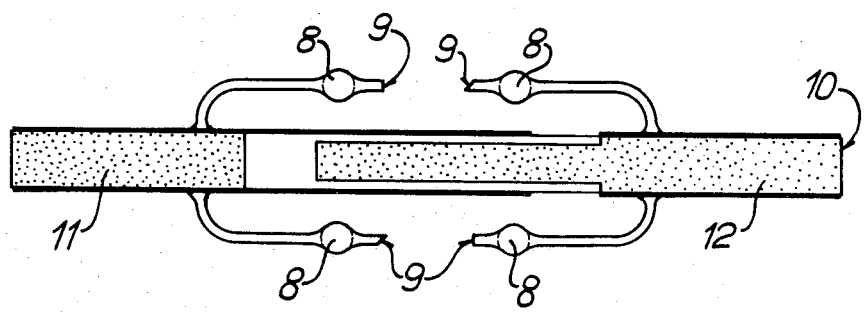
FIG. 4 shows the parting of the connection members in accordance with the invention.
Figure 5:
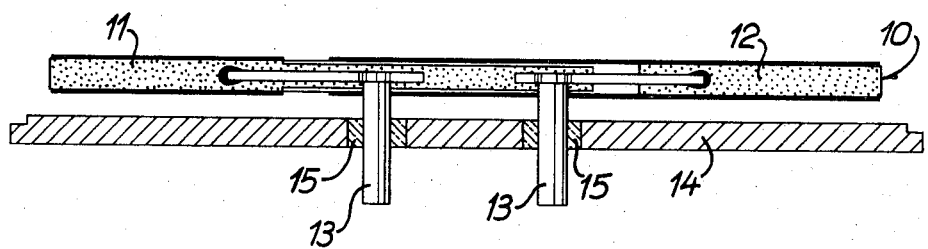
FIG. 5 shows an outline of a resonator equipped with a suspension device obtained by the process.

The resonator 10 thus equipped with its four connections is shown in FIG. 4.

In accordance with the process, the ends of the second parts of the connections are welded to the supports 13, and for this reason the bulges 8 are provided at these ends, and cover exactly the ends of the supports 13. These supports 13 are mounted in the base of a case 14, whose lid is not shown. If the base is metal, the supports are completely insulated by insulating bushes, for example of glass. The case containing the resonator 10 suspended thus by its connections 3 welded on the one hand to the electrodes 10 and 11, and on the other to the supports 13, is hermetically sealed by a lid, after which this has been done, the case can be filled with an inert gas, for example at low pressure.

Cutting of the comb-pieces can be achieved either by a tool (die and punch), photochemical processing, spark erosion or any other process.

Separation of the connections from the comb-piece is preferably done by stamping.

The thickness of the metal plate is preferably between 0.10 and 0.30 mm. The width of the connections is preferably nearly the thickness of the plate.

From this description, it will be seen how easily this suspension device can be obtained and secured on the one hand to the resonator and on the other to the suports mounted on the case.

It will also be seen that the reproducibility of these devices is assured.

Preferably, the distance between the two stubs secured to the two electrodes on the same side of the resonator, is equal to 0.552L, where L is the length of the resonator bar, corresponding to the nodal points of the envisaged flexure mode.

With this suspension device a high degree of stability is obtained of the electrical characteristics of the resonator, the latter being separated to the maximum degree from its environment, and secured by its nodal points in a safe and reproducible manner.

What is claimed is:

1. A process for the manufacture of a piezoelectric resonator suspension device comprising the steps of:
 a. forming a comb-piece from a thin metal plate,
 b. forming positioning means in the thin metal plate for positioning same in a jig,
 c. forming at least one connection in the comb-piece, said connection having an end part forming a stub and a flexible spring-like portion connecting said connection to the comb-piece and a bulge being provided in said flexible spring-like portion in proximity to where said portion joins the comb-piece,
 d. providing a welding plate on said stub,
 e. positioning said comb-piece by means of said positioning means in said jig and positioning a said resonator in said jig so that said stub equipped with said welding plate comes to bear against a predetermined point on one electrode of the piezoelectric resonator.
 f. welding said welding plate to said predetermined point on said one electrode,
 g. parting said flexible spring-like portion from said comb-piece between the comb-piece and said bulge, and
 h. welding said bulge to a support of the suspension device.

2. A process according to claim 1, further comprising the steps of forming two like said connections in the comb-piece so that when said comb-piece and said resonator are positioned in said jig the welding plate of each connection can be welded to the corresponding one of two electrodes of said resonator, parting the flexible spring-like portion of each said connection from said comb-piece between the comb-piece and the corresponding bulge, and welding each bulge to a discrete support of the suspension device.

3. A process according to claim 2, further comprising forming in said comb-piece a pair of abutments in the form of additional positioning devices, one abutment being situated near the stub of each said connection, and each abutment projecting outwardly from said comb-piece in relation to the outward projection from said comb-piece of the corresponding welding plate such that when said abutments are positioned against the corresponding one of said electrodes each welding plate is urged slightly inwardly towards the comb-piece by flexing of the flexible spring-like portion of the corresponding said connection.

4. A process according to claim 1, further comprising carrying out the steps *a*) to *h*) in relation to each of two opposite sides of said one of said electrodes of the resonator so that a pair of said connections are provided to said one of said electrodes and the bulge of each of said connections is welded to a discrete support of the suspension device.

5. A process according to claim 1, in which said comb-piece is formed of gilded beryllium bronze and said stub is welded to said predetermined point on said one electrode by a gold and tin based weld.

* * * * *